US005467575A

United States Patent [19]

Weder et al.

[11] Patent Number: 5,467,575
[45] Date of Patent: * Nov. 21, 1995

[54] METHOD FOR WRAPPING A FLORAL GROUPING WITH A SHEET OF MATERIAL HAVING A REINFORCING MEMBER

[75] Inventors: Donald E. Weder; Joseph G. Straeter, both of Highland, Ill.

[73] Assignee: Highland Supply Corporation, Highland, Ill.

[*] Notice: The portion of the term of this patent subsequent to Nov. 15, 2011, has been disclaimed.

[21] Appl. No.: 270,071

[22] Filed: Jul. 1, 1994

Related U.S. Application Data

[63] Continuation of Ser. No. 928,242, Aug. 10, 1992, Pat. No. 5,363,630, which is a continuation-in-part of Ser. No. 687,701, Apr. 18, 1991, abandoned, and a continuation-in-part of Ser. No. 803,318, Dec. 4, 1991, Pat. No. 5,344,016, which is a continuation-in-part of Ser. No. 707,417, May 28, 1991, abandoned, which is a continuation of Ser. No. 502,358, Mar. 29, 1990, abandoned, which is a continuation-in-part of Ser. No. 391,463, Aug. 9, 1989, abandoned, which is a continuation-in-part of Ser. No. 249,761, Sep. 26, 1988, abandoned.

[51] Int. Cl.$^6$ .............................. B65B 25/02; B65B 11/58; B65B 5/06
[52] U.S. Cl. ............................... 53/399; 53/410; 53/449; 53/461; 53/472
[58] Field of Search .............................. 53/399, 410, 449, 53/461, 472, 397, 462, 465

[56] References Cited

U.S. PATENT DOCUMENTS

| | | |
|---|---|---|
| 314,054 | 3/1885 | Pease et al. |
| 557,526 | 3/1896 | Egge. |
| 732,889 | 7/1903 | Paver. |
| 1,520,647 | 12/1924 | Hennegan. |
| 1,525,015 | 2/1925 | Weeks. |
| 1,610,652 | 12/1926 | Bouchard. |
| 1,708,752 | 4/1929 | Caras. |
| 1,748,360 | 2/1930 | Millspaugh. |
| 1,863,216 | 6/1932 | Wordingham. |

(List continued on next page.)

FOREIGN PATENT DOCUMENTS

| | | |
|---|---|---|
| 2036163 | 12/1970 | France. |
| 2272914 | 12/1975 | France. |
| 2589436 | 5/1987 | France. |
| 2610604 | 8/1988 | France. |
| 513971 | 12/1930 | Germany. |
| 880254 | 3/1990 | Netherlands. |

OTHER PUBLICATIONS

Brochure —"The Simple Solution For Those Peak Volume Periods", Highland Supply Speed Cover® Brochure, 1989©, 6 pages.
Brochure —"Speed Sheets® And Speed Rolls", Highland Supply Speed Sheets® Brochure, 1990©, 2 pages.
Brochure —"A World of Cut Flower and Pot Plant Packaging", Klerk's Plastic Products Manufacturing, Inc. Brochure, date unknown, 6 pages.
Photocopy —A Fan–folded "Post–IT® Note Pad," R–330, 1 pad (100 sheets) 3– ×3" (76.2 mm×76.2 mm) Manufactured by 3M Commercial Office Supply Division, St. Paul, Minn. 55144–1000. (Package only).
Photocopy —A 6539 note pad "Highland®" Brand Self–stic Removable Notes, 1 pad (100 Sheets per pad) 1½×2" (38.1 mm×50.8 mm). Manufactured by 3M Commercial Office Supply Division, St. Paul, Minn. 55144–1000. (Package Only).
Photograph of a ribbon material made by Loose Ends, Keizer, Ore., on sale since 1989.

*Primary Examiner*—Horace M. Culver
*Attorney, Agent, or Firm*—Dunlap & Codding

[57] ABSTRACT

A sheet of material having a closure bonding material disposed thereon and a reinforcing member associated with the sheet of material. The sheet of material is wrapped about a floral grouping to provide a wrapper. The reinforcing member cooperates to provide reinforcing member rigidity to the wrapper for preventing damage during movement when the wrapper is packed in a carton.

20 Claims, 1 Drawing Sheet

U.S. PATENT DOCUMENTS

| | | | |
|---|---|---|---|
| 1,978,631 | 10/1934 | Herrlinger | 91/68 |
| 2,048,123 | 7/1936 | Howard | 229/87 |
| 2,076,450 | 4/1937 | Doty | 47/34 |
| 2,141,484 | 12/1938 | Piglia | 47/28 |
| 2,152,648 | 4/1939 | Jones | 47/34 |
| 2,170,147 | 8/1939 | Lane | 206/56 |
| 2,278,673 | 4/1942 | Savada et al. | 154/43 |
| 2,371,985 | 3/1945 | Freiberg | 206/46 |
| 2,411,328 | 11/1946 | MacNab | 33/12 |
| 2,502,586 | 4/1950 | Ottinger | 53/449 |
| 2,510,120 | 6/1950 | Leander | 117/122 |
| 2,529,060 | 11/1950 | Trillich et al. | 117/68.5 |
| 2,544,075 | 3/1951 | Ernst et al. | 150/49 |
| 2,621,142 | 12/1952 | Wetherell | 154/117 |
| 2,774,187 | 12/1956 | Smithers | 47/41 |
| 2,822,287 | 2/1958 | Avery | 117/14 |
| 2,846,060 | 8/1958 | Yount | 206/58 |
| 2,883,262 | 4/1959 | Borin | 21/56 |
| 2,942,823 | 6/1960 | Chapman | 248/97 |
| 2,968,124 | 1/1961 | Coplen | 47/37 |
| 3,022,605 | 2/1962 | Reynolds | 47/58 |
| 3,113,712 | 12/1963 | Kindseth | 229/14 |
| 3,121,647 | 2/1964 | Harris et.al. | 118/202 |
| 3,130,113 | 4/1964 | Silman | 161/97 |
| 3,148,799 | 9/1964 | Meroney | 220/63 |
| 3,215,330 | 11/1965 | Thomas | 229/14 |
| 3,271,922 | 9/1966 | Wallerstein et al. | 53/3 |
| 3,316,675 | 5/1967 | Cartwright | 47/37 |
| 3,508,372 | 4/1970 | Wallerstein et al. | 53/3 |
| 3,514,012 | 5/1970 | Martin | 220/63 |
| 3,620,366 | 11/1971 | Parkinson | 206/59 |
| 3,681,105 | 8/1972 | Milutin et al. | 117/15 |
| 3,748,781 | 7/1973 | Erling | 48/34.11 |
| 3,757,990 | 9/1973 | Buth | 220/63 |
| 3,927,821 | 12/1975 | Dunning | 229/14 |
| 4,054,697 | 10/1977 | Reed et al. | 428/40 |
| 4,205,750 | 6/1980 | Dews | 53/449 X |
| 4,216,620 | 8/1980 | Weder et al. | 47/72 |
| 4,297,811 | 11/1981 | Weder | 47/72 |
| 4,333,267 | 6/1982 | Witte | 47/84 |
| 4,379,101 | 4/1983 | Smith | 264/40.3 |
| 4,380,564 | 4/1983 | Cancio et al. | 428/167 |
| 4,413,725 | 11/1983 | Bruno et al. | 206/45.33 |
| 4,546,875 | 10/1985 | Zweber | 206/0.82 |
| 4,733,521 | 3/1988 | Weder et al. | 53/580 |
| 4,765,464 | 8/1988 | Ristvedt | 206/0.82 |
| 4,773,182 | 9/1988 | Weder et al. | 47/72 |
| 4,882,893 | 11/1989 | Spencer et al. | 53/465 X |
| 4,989,396 | 2/1991 | Weder et al. | 53/397 |
| 5,111,638 | 5/1992 | Weder | 53/397 |
| 5,181,364 | 1/1993 | Weder | 53/465 X |
| 5,245,814 | 9/1993 | Weder | 53/462 X |
| 5,363,630 | 11/1994 | Weder et al. | 53/399 |

METHOD FOR WRAPPING A FLORAL GROUPING WITH A SHEET OF MATERIAL HAVING A REINFORCING MEMBER

RELATED REFERENCES

CROSS REFERENCE TO RELATED APPLICATIONS

"This application is a continuation of U.S. Ser. No. 07/928,242, filed Aug. 10, 1992, entitled "FLORAL GROUPING WRAPPER WITH REINFORCING MEMBER", now U.S. Pat. No. 5,363,630, which is a continuation-in-part of U.S. Ser. No. 07/803,318, filed Dec. 4, 1991, entitled "WRAPPING MATERIAL FOR WRAPPING A FLORAL GROUPING HAVING STAGGERED STRIPS OF ADHESIVE APPLIED THERETO AND METHOD", now U.S. Pat. No. 5,344,016, which is a continuation-in-part of U.S. Ser. No. 07/707,417, filed May 28, 1991, now abandoned, entitled "WRAPPING A FLORAL GROUPING WITH SHEETS HAVING ADHESIVE OR COHESIVE MATERIAL APPLIED THERETO", which is a continuation of U.S. Ser. No. 07/502,358, filed Mar. 29, 1990, now abandoned, entitled "WRAPPING A FLORAL GROUPING WITH SHEETS HAVING ADHESIVE OR COHESIVE MATERIAL APPLIED THERETO", which is a continuation-in-part of U.S. Ser. No. 07/391,463, filed Aug. 9, 1989, now abandoned, entitled "ADHESIVE APPLICATOR", which is a continuation-in-part of U.S. Ser. No. 07/249,761, filed Sep. 26, 1988, now abandoned, entitled "METHOD FOR WRAPPING AN OBJECT IN A MATERIAL HAVING PRESSURE SENSITIVE ADHESIVE THEREON"; and Ser. No. 928,242 is also a continuation-in-part of U.S. Ser. No. 07/687,701, filed Apr. 18, 1991, now abandoned, entitled, "WRAPPING MATERIAL HAVING A SHAPE SUSTAINING ELEMENT AND METHOD".

FIELD OF THE INVENTION

The present invention relates generally to wrappers for floral groupings and, more particularly, but not by way of limitation, to a sheet of material for wrapping a floral grouping with a closure bonding material and a reinforcing member wherein the sheet of material is wrapped about a floral grouping and secured thereabout to form the wrapper with the reinforcing member providing rigidity to the wrapper for substantially preventing damage to the floral grouping.

DESCRIPTION OF THE PREFERRED EMBODIMENTS

Figures 1, 2:
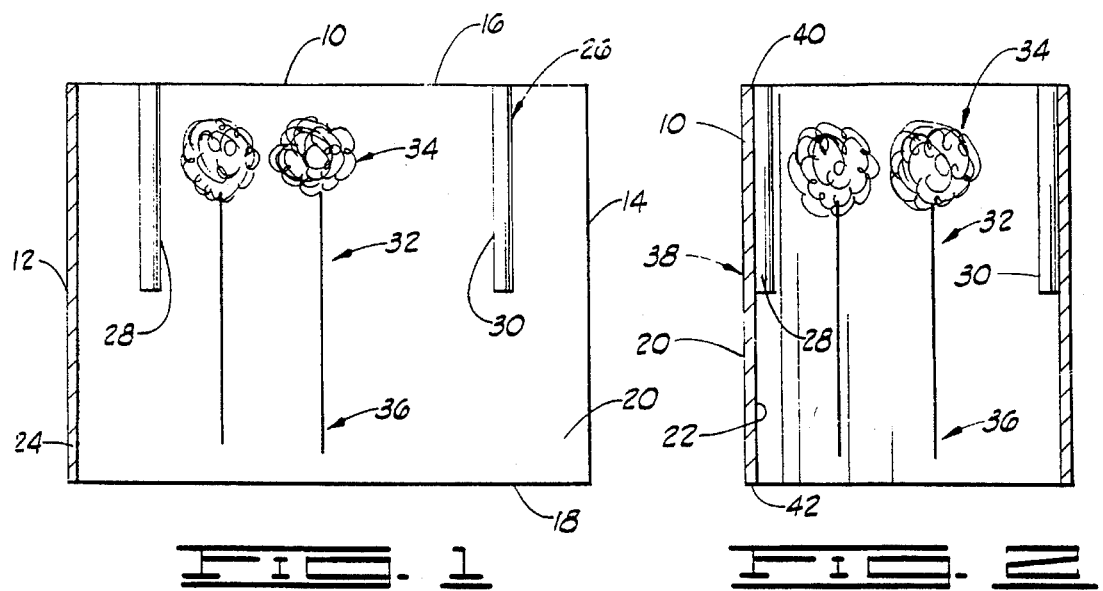
FIG. 1 is a top plan view of a sheet of material constructed in accordance with the present invention diagrammatically showing a floral grouping disposed or placed on the sheet of material.
FIG. 2 is a sectional view of the sheet of material of FIG. 1 wrapped about the floral grouping.

Shown in FIG. 1 and designated therein by the general reference numeral 10 is a sheet of material constructed in accordance with the present invention. The sheet of material 10 has a first end 12, a second end 14, a first side 16, a second side 18, an upper surface 20 and a lower surface 22.

A closure bonding material 24 is disposed on the upper surface 20 of the sheet of material 10. The closure bonding material 24 more particularly is disposed near the first end 12 of the sheet of material 10 and extends between the first side 16 and the second side 18 of the sheet of material 10.

Although the closure bonding material 24 is shown in FIG. 1 in the form of a strip of closure bonding material 24, the closure bonding material 24 may be in the form of spots of closure bonding material and the spots may be circularly shaped, square shaped, rectangularly shaped or any other geometric shape. Further, the closure bonding material 24 may be placed on the upper surface 20 of the sheet of material 10 in the form of patterns such as heart shapes or any other pattern and, in some instances, the closure bonding material 24 may include color agents to impart a tint or color to the closure bonding material 24. The closure bonding material 24 may cover the entire upper surface 20 of the sheet of material 10 or any portion thereof and the strip of closure bonding material 24 shown in FIG. 1 along the first end 12 of the sheet of material 10 solely for the purpose of illustration.

The term "bonding material" as used herein means an adhesive, preferably a pressure sensitive adhesive, preferably a pressure sensitive adhesive, or a cohesive. Where the bonding material is a cohesive, a similar cohesive material must be placed on the to be adjacent surface to be bonded for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" as used herein also means a heat sealing lacquer which may be applied to the sheet of material and, in this instance, heat also must be applied to effect the sealing. The term "bonding material" as used herein means any type of material or thing which can be used to effect the bonding or connecting of the two adjacent portions of the material or sheet of material to effect the connection or bonding described herein.

The sheet of material 10 is constructed from any suitable flexible material that is capable of being wrapped about the floral grouping 32, as described herein. Preferably, the sheet of material 10 is constructed of a material selected from a group of materials consisting of paper, metal foil, cloth (natural or synthetic), denim, burlap or polymer film or combinations thereof.

The term "polymer film" as used herein means any polymer film. For example, but not by way of limitation, one polymer film is a polypropylene film. Another example of a polymer film, but not by way of limitation, is cellophane.

The sheet of material 10 has a thickness in a range from about 0.1 mils to about 30 mils. Preferably, the sheet of material 10 has a thickness in a range from about 0.1 mils to about 5 mils.

The sheet of material 10 may be any shape and a rectangular shape is shown in FIG. 1 only by way of example. The sheet of material 10 for example only may be square, rectangular, circular or any other geometric shape such as heart shaped for example only.

The sheet of material 10 may be constructed of a single layer of material or a plurality of layers of the same or different types of materials. Any thickness of the sheet of material 10 maybe utilized in accordance with the present invention as long as the sheet of material 10 is wrappable about the floral grouping 32, as described herein. Additionally, an insulating material such as bubble film, preferable as one of two or more layers, can be utilized in order to provide additional protection for the item wrapped therein. The layers of material comprising the sheet of material 10 may be connected together or laminated or may be separate layers.

Reinforcing member means 26 is connected to the sheet of material 10. More particularly, the reinforcing member means is disposed on and connected to a portion of the upper surface 20 of the sheet of material 10.

The reinforcing member means 26 comprises a first reinforcing member 28 and a second reinforcing member 30. The first reinforcing member 28 is spaced a distance from the first end 12 of the sheet of material 10 and extends a distance between the first and the sides 16 and 18 of the sheet of material 10. The second reinforcing member 30 is spaced a distance from the first reinforcing member 28. The second reinforcing member 30 is spaced a distance from the second end 14 of the sheet of material 10 and the second reinforcing member 30 extends a distance between the first and the second sides 16 and 18 of the sheet of material 10.

As shown in FIG. 1, the first and the second reinforcing members 28 and 30 each are spaced a distance from the second side 18 of the sheet of material 10. The first and the second reinforcing members 28 and 30 may extend between the first and the second sides 16 and 18 of the sheet of material 10 if desired in a particular application.

The first and the second reinforcing members 28 and 30 may be wire elements, plastic rods or bars or sheets of material any other element capable of imparting the desired rigidity to the sheet of material 10 for reasons which will be described in greater detail below. Although the reinforcing members 28 and 30 are shown as a single continuous strip of a reinforcing member element, the first and the second reinforcing members 28 and 30 also may be a plurality of individual, separate reinforcing member elements disposed on the sheet of material 10 to form the first and the reinforcing members 28 and 30 if desired in a particular application.

The floral grouping 32 is disposed on the upper surface 20 of the sheet of material 10. The floral grouping 32 has a bloom end 34 and a stem end 36.

"Floral grouping" as used herein means cut fresh flowers, artificial flowers, a single flower, other fresh and/or artificial plants or other floral materials and may include other secondary plants and/or ornamentation which add to the aesthetics of the overall floral grouping.

After the floral grouping 32 has been disposed on the upper surface 20 of the sheet of material 10, the second end 14 of the sheet of material 10 is extended in a general direction 33 and rolled over and wrapped about the floral grouping in one or a series of wraps until the sheet of material 10 has been wrapped about the floral grouping 32. In this position, at least a portion of the closure bonding material 24 engages a portion of the lower surface 22 of the sheet of material 10 and bondingly engages and connects the adjacent portions of the sheet of material 10 to bondingly secure the sheet of material 10 wrapped about the floral grouping 32 to form a wrapper 38, as shown in FIG. 2. As shown in FIG. 2, the wrapper 38 is generally cylindrically shaped and has an opened upper end 40 and a opened lower end 42.

It should be noted that the sheet of material 10 may be wrapped about the floral grouping 32 to form a conically shaped wrapper or any other shape of wrapper in lieu of the cylindrically shaped wrapper 38 as shown in FIG. 2, if desired in a particular application. The wrapper 38 may be conically shaped.

At least a portion of the floral grouping 32 is disposed within the wrapper 38. In some applications, the stem end 36 of the floral grouping 32 extends through the open lower end 40 of the wrapper 38. In some applications, the sheet of material 10 is tightly wrapped about the stem end 36 of the floral grouping 32. The bloom end 34 of the floral grouping 32 is disposed near the open upper end 40 of the floral grouping 32 and the bloom end 34 of the floral grouping 32 is visible via the open upper end 40 of the wrapper 38. In some applications, the upper end 40 of the wrapper 38 may be closed if desired. In some applications, the lower end 42 of the wrapper 38 may be closed if desired. The bloom end 34 of the floral grouping 32 is disposed below the upper end 40 of the wrapper 38.

A decorative pattern, such as a color and/or an embossed pattern, and/or other decorative surface ornamentation may be applied to the upper surface 20 and/or the lower surface 22 of the sheet of material 10 or portions thereof including, but not limited to printed design, coatings, colors, flocking or metallic finishes. The sheet of material 10 also may be totally or partially clear or tinted transparent material.

When the sheet of material 10 is wrapped about the floral grouping 32 to form the wrapper 38, the first and the second reinforcing members 28 and 30 each are disposed near the upper end 40 of the wrapper 38 and each of the first and the second reinforcing members 28 and 30 extends a distance through the wrapper 38 toward the lower end 42. The first and the second reinforcing members 28 and 30 and the upper surface 20 of the sheet of material 10 are disposed generally adjacent the floral grouping 32 when the sheet of material 10 is wrapped about the floral grouping 32 to provide the wrapper 38 with the lower surface 22 of the sheet of material 10 providing the exterior or outer surface of the wrapper 38.

It should be noted that the first and the second reinforcing members 28 and 30 also could be disposed on and connected to the lower surface 22 if desired in a particular application. Also, only one of the reinforcing members 28 or 30 may be used if desired in a particular application.

Figures 3, 4:
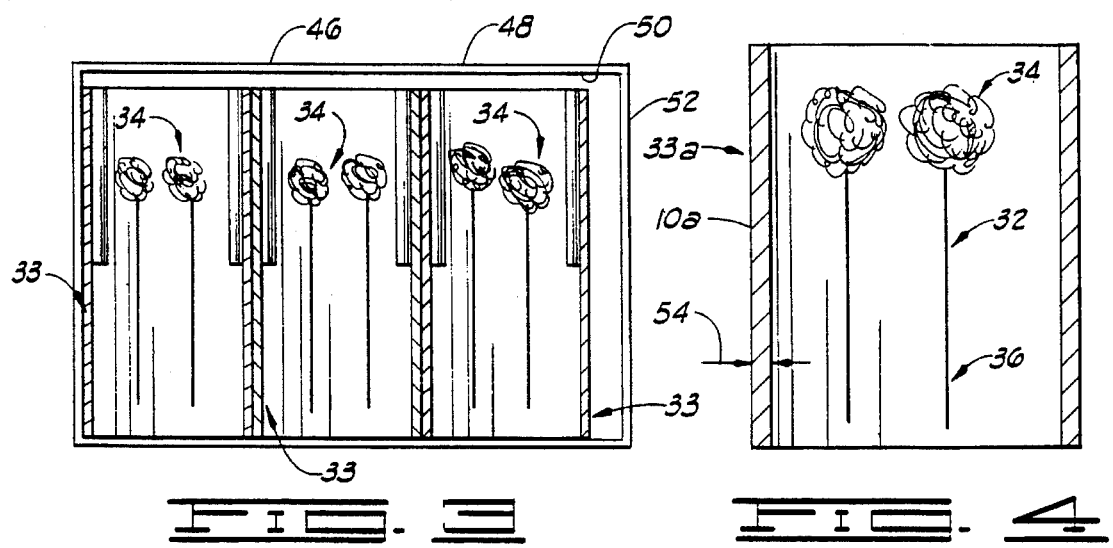
FIG. 3 is a top plan view of a carton showing a plurality of the wrappers of FIG. 2 with floral groupings therein disposed in a carton.
FIG. 4 is a view of a modified sheet of material wrapped about a floral grouping to form a modified wrapper.

In a particular application, a plurality of floral groupings 32 each are wrapped with a separate, individual sheet of material 10 to form a plurality of wrappers 38. The wrappers 38 are disposed in the floral grouping storage space 44 of a carton 46, as shown in FIG. 3. In FIG. 3, three wrappers 38 are disposed in the floral grouping storage space 44 of the carton 46 for the purpose of illustration. The present invention contemplates that one or more wrappers 38 may be disposed in the floral grouping storage space 44 of the carton 46 if desired in a particular application.

The carton 46 comprises a plurality of side walls 48. The side walls 48 are connected together to form a generally rectangularly shaped carton 46, as shown in FIG. 3 with an interior surface 50 of the side walls 48 substantially surrounding a portion of the wrappers 38. Although the side walls 48 have been shown in FIG. 3 as being connected to form a generally rectangularly shape carton 46, the side walls 48 could comprise a continuous side wall providing a circular shaped carton or the side walls 48 could be connected to form any other shape of carton 46 if desired in a particular application.

After the wrappers 38 have been placed the carton 46, an open upper end 52 of the carton 46 generally is closed with a lid or other closure means (not shown) so that the carton 46 with the wrappers 38 is disposed therein can be transported to different locations such as during shipment of the carton 46.

During movement of the carton 46 such as during shipment of the carton 46 for example, the wrappers 38 commonly shift or move in the carton 46. This movement can result in upper end 40 of any of the wrappers 38 engaging the interior surface 50 of a portion of the side walls 48. This engagement between the wrapper 38 and the interior surface 50 of the side walls 48 results in a tendency for the wrapper 38 to be crushed resulting in damage to the bloom end 34 of the floral grouping 32 which is not desirable.

In operation of the present invention, the reinforcing member means 26 engages the interior surface 50 of the side walls 48 when the wrappers 38 are shifted in the carton 46 and the reinforcing member means 26 cooperates to prevent engagement of the interior surface 50 of the side walls 48 with the floral groupings 32 thereby cooperating to substantially reduce or prevent damage to the bloom end 34 of the floral grouping 32 when the wrapper 38 shifts or moves in the carton 46 during movement of the carton 46.

EMBODIMENT OF FIG. 4

Shown in FIG. 4 is a modified wrapper 38a constructed of a modified sheet of material 10a. The sheet of material 10a is constructed exactly like the sheet of material 10 described in detail before, except the sheet of material 10a does not include a first and a second reinforcing member like the first and the second reinforcing members 28 and 30 described before in connection with the embodiment shown in FIGS. 1, 2 and 3. Rather, the sheet of material 10b has a thickness 54 which is sufficiently large to impart sufficient reinforcing member rigidity to the sheet of material 10a so that the sheet of material 10a per se cooperates to provide the reinforcing member integrity for substantially reducing or preventing damage to the bloom end 34 of the floral grouping 32 when the wrappers 38a are disposed in the carton 46 (FIG. 3).

The thickness 54 of the sheet of material 10a preferably is greater than 2 mils and preferably is about 3 mils or greater. The exact thickness 54 required for the sheet of material 10a to function in the manner described before is dependent at least to some extent on the particular type of material selected.

EMBODIMENT OF FIG. 5

Figure 5:
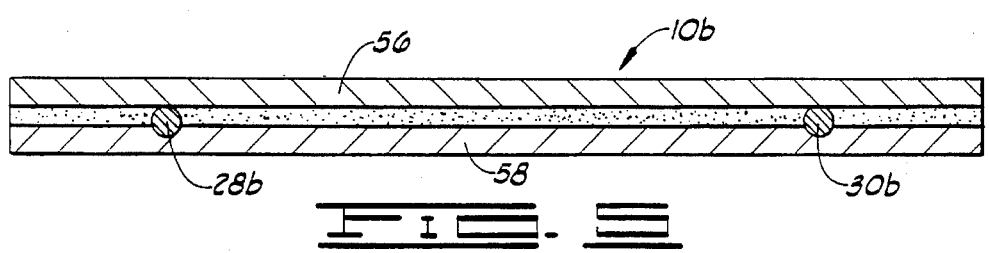
FIG. 5 is a sectional view of a modified sheet of material for providing a wrapper similar to the wrapper shown in FIG. 2.

Shown in FIG. 5 is another modified sheet of material 10b. The sheet of material 10b comprises a first sheet of material 56 and a second sheet of material 58. The first and the second sheets of material 56 and 58 may be constructed of the same material or the first and the second sheets of material 56 and 58 may be constructed of dissimilar materials.

The first and the second reinforcing members 28b and 30b are disposed between the first and the second sheets of material 56 and 58. In this position of the first and the second reinforcing members 28 and 30, the first sheet of material 56 is laminated or bondingly connected or otherwise connected to the second sheet of material 58 to form the sheet of material 10b with the first and the second reinforcing members 28 and 30 being integrally formed in the sheet of material 10b and held in a position by way of the fact that the first and the second reinforcing members 28b and 30b are laminated between the first and the second sheets of material 56 and 58.

Other than as described above, the sheet of material 10b is constructed exactly like the sheet of material 10 shown in FIGS. 1 and 2 and described in detail before. Further, the sheet of material 10b is wrapped about the floral grouping 32 to form the wrapper 38 in the manner exactly like that described before in connection with the embodiments shown in FIGS. 1 and 2.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A method for wrapping a floral grouping comprising:

providing a sheet of material with a closure bonding material disposed thereon and with reinforcing member means being connected thereto;

providing the floral grouping;

placing the floral grouping on the sheet of material; and wrapping the floral grouping with the sheet of material, the closure bonding material engaging portions of the sheet of material to cooperate in securing the sheet of material wrapped about the floral grouping to provide a wrapper with at least a portion of the floral grouping being disposed in the wrapper, the reinforcing member means cooperating to provide reinforcing member rigidity to at least a portion of the wrapper so that when the wrapped floral grouping is disposed within a carton and the reinforcing member or the sheet of material engages a sidewall of the carton the reinforcing member prevents engagement of the floral grouping with the side wall of the carton.

2. The method of claim 1 wherein the step of providing the floral grouping is defined further as providing the floral grouping with a stem end and a bloom end, and wherein the step of wrapping the floral grouping with the sheet of material is defined further as wrapping the floral grouping with the sheet of material to provide the wrapper having an upper end and a lower end, the bloom end of the floral grouping being disposed near the upper end of the wrapper and at least a portion of the reinforcing member means being disposed near the upper end of the wrapper.

3. The method of claim 1 wherein the step of wrapping the floral grouping is defined further as wrapping the floral grouping with the sheet of material to form the wrapper having a substantially cylindrically shape.

4. The method of claim 1 wherein the step of wrapping the floral grouping is defined further as wrapping the floral grouping with the sheet of material to form the wrapper having a substantially conical shape.

5. The method of claim 1 wherein the step of providing the sheet of material is defined further as providing the sheet of material constructed from a material selected from the group of materials consisting of paper, metal foil, cloth (natural or synthetic), denim, burlap or film or combinations thereof.

6. A method for wrapping a floral grouping comprising:

providing a sheet of material with a closure bonding material disposed thereon and with reinforcing member means being disposed thereon;

providing the floral grouping;

placing the floral grouping on the sheet of material;

wrapping the floral grouping with the sheet of material, the closure bonding material engaging portions of the sheet of material to cooperate in securing the sheet of material wrapped about the floral grouping to provide a wrapper with at least a portion of the floral grouping being disposed in the wrapper, the reinforcing member means cooperating to provide reinforcing member rigidity to at least a portion of the wrapper disposed about the floral grouping;

providing a carton having a floral grouping storage space with side wall means surrounding at least a portion of the floral grouping storage space; and disposing the wrapper with the floral grouping disposed therein in the floral grouping storage space of the shipping carton, a portion of the reinforcing member means or the wrapper or a combination thereof being engageable with the side wall means during movement of the wrapper in the carton such that the reinforcing member means prevents engagement of the side wall means with the floral grouping.

7. A method for wrapping a floral grouping comprising:

providing a sheet of material with a closure bonding material disposed thereon and with reinforcing member means being disposed thereon;

providing the floral grouping;

placing the floral grouping on the sheet of material;

wrapping the floral grouping with the sheet of material, the closure bonding material engaging portions of the sheet of material to cooperate in securing the sheet of material wrapped about the floral grouping to provide a wrapper with at least a portion of the floral grouping being disposed in the wrapper, the reinforcing member means cooperating to provide reinforcing member rigidity to at least a portion of the wrapper disposed about the floral grouping;

providing a carton having a floral grouping storage space with side wall means surrounding at least a portion of the floral grouping storage space;

disposing the wrapper with the floral grouping disposed therein in the floral grouping storage space of the shipping carton, a portion of the reinforcing member means or the wrapper or a combination thereof being engageable with the side wall means during movement of the wrapper in the carton and the reinforcing member means for preventing engagement of the side wall means with the floral grouping; and wherein the floral grouping is defined further as having a bloom end and a stem end, and wherein the step of disposing the floral grouping in the floral grouping storage space of the carton is defined further as disposing the floral grouping in the floral grouping storage space of the carton whereby the reinforcing member means is disposable about the bloom end of the floral grouping so that the reinforcing member means prevents engagement of the side wall means with the bloom end of the floral grouping, the reinforcing member means thereby cooperating to substantially reduce or prevent damage to the bloom end of the floral grouping when the wrapper moves in the carton.

8. A method for wrapping a floral grouping comprising:

providing a sheet of material with reinforcing member means being connected thereto;

providing the floral grouping;

placing the floral grouping on the sheet of material;

wrapping the floral grouping with the sheet of material to form a wrapper wrapped about at least a portion of the floral grouping, the reinforcing member means cooperating to provide reinforcing member rigidity to at least a portion of the wrapper wrapped about the floral grouping;

providing a carton having a floral grouping storage space with side wall means surrounding at least a portion of the floral grouping storage space; and disposing the wrapper with the floral grouping disposed therein in the storage space of the shipping carton, a portion of the wrapper, in combination with the reinforcing member means, being engageable with the side wall means during movement of the wrapper in the carton so that the reinforcing member means prevents engagement of the side wall means with the floral grouping.

9. A method for wrapping a floral grouping comprising:

providing a sheet of material with reinforcing member means being connected to the sheet of material;

providing the floral grouping;

placing the floral grouping on the sheet of material;

wrapping the floral grouping with the sheet of material to form a wrapper wrapped about at least a portion of the floral grouping, the reinforcing member means cooperating to provide reinforcing member rigidity to at least a portion of the wrapper;

providing a carton having a floral grouping storage space with side wall means surrounding at least a portion of the floral grouping storage space;

disposing the wrapper with the floral grouping disposed therein in the storage space of the shipping carton, a portion of the wrapper or the reinforcing member means or a combination thereof being engageable with the side wall means during movement of the wrapper in the carton for cooperating to prevent engagement of the side wall means with the floral grouping; and wherein the floral grouping is defined further as having a bloom end and a stem end, and wherein the reinforcing member means is disposed about at least a portion of the bloom end of the floral grouping and wherein the step of disposing the floral grouping in the floral grouping storage space of the carton is defined further as disposing the floral grouping in the floral grouping storage space of the carton whereby the reinforcing member means prevents engagement of the side wall means with the bloom end of the floral grouping, the reinforcing member means thereby cooperating to substantially reduce or prevent damage to the bloom end of the floral grouping when the wrapper moves in the carton.

10. A method for wrapping a floral grouping comprising:

providing the sheet of material with a closure bonding material disposed thereon and with reinforcing member means being connected thereto;

providing the floral grouping, the floral grouping having a stem end and a bloom end;

placing the floral grouping on the sheet of material;

wrapping the floral grouping with the sheet of material, the closure bonding material engaging portions of the sheet of material to cooperate in securing the sheet of material wrapped about the floral grouping to provide a wrapper with at least a portion of the bloom end of the floral grouping being disposed in the wrapper, the wrapper having an upper end and a lower end, the bloom end of the floral grouping being disposed near the upper end of the wrapper and at least a portion of the reinforcing member means being disposed near the upper end of the wrapper, the reinforcing member means cooperating to provide reinforcing member rigidity to at least a portion of the wrapper;

providing a carton having a floral grouping storage space with side wall means surrounding at least a portion of the floral grouping storage space; and disposing the wrapper with the floral grouping therein in the floral grouping storage space of the carton, the reinforcing member means or the wrapper or a combination thereof being engageable with at least a portion of the side wall means of the carton adjacent the upper end of the wrapper, the reinforcing member means cooperating to prevent engagement of the side wall means with the bloom end of the floral grouping.

11. The method of claim 10 wherein the step of wrapping the floral grouping is defined further as wrapping the floral grouping with the sheet of material to form the wrapper having a substantially cylindrically shape.

12. The method of claim 10 wherein the step of wrapping the floral grouping is defined further as wrapping the floral grouping with the sheet of material to form the wrapper having a substantially conical shape.

13. The method of claim 10 wherein the step of providing the sheet of material is defined further as providing the sheet of material constructed from a material selected from the group of materials consisting of paper, metal foil, fiber (natural or synthetic), denim, burlap or film or combinations thereof.

14. A method for wrapping a floral grouping comprising:

providing a sheet of material with a closure bonding material disposed thereon and with reinforcing member means being disposed thereon;

providing the floral grouping;

placing the floral grouping on the sheet of material;

wrapping the floral grouping with the sheet of material, the closure bonding material engaging portions of the sheet of material to cooperate in securing the sheet of material wrapped about the floral grouping to provide a wrapper with at least a portion of the floral grouping being disposed in the wrapper, the reinforcing member means cooperating to provide reinforcing member rigidity to at least a portion of the wrapper;

providing a carton having a floral grouping storage space with side wall means surrounding at least a portion of the floral grouping storage space;

disposing the wrapper with the floral grouping therein in the floral grouping storage space of the carton, the wrapper or the reinforcing member means or a combination thereof being engageable with the side wall means of the carton whereby the reinforcing member means prevents engagement of the side wall means with the floral grouping; and wherein the floral grouping is defined further as having a bloom end and a stem end, and wherein the step of disposing the floral grouping in the floral grouping storage space of the carton is defined further as disposing the floral grouping in the floral grouping storage space of the carton whereby the wrapper or the reinforcing member means or a combination thereof is engageable with the side wall means and the reinforcing member means cooperates to prevent engagement of the side wall means with the bloom end of the floral grouping, the reinforcing member means thereby cooperating to substantially reduce or prevent damage to the bloom end of the floral grouping when the wrapper moves in the carton.

15. A method for wrapping a floral grouping comprising:

providing a sheet of material with reinforcing member means being connected to the sheet of material;

providing the floral grouping;

placing the floral grouping on the sheet of material;

wrapping the floral grouping with the sheet of material to form a wrapper wrapped about at least a portion of the floral grouping, the reinforcing member means cooperating to provide reinforcing member rigidity to at least a portion of the wrapper;

providing a carton having a floral grouping storage space with side wall means surrounding at least a portion of the floral grouping storage space; and disposing the wrapper with the floral grouping therein in the floral grouping storage space of the carton, the wrapper or the reinforcing member means or a combination of the wrapper and the reinforcing member means being engageable with at least the side wall means of the carton such that the reinforcing member means cooperates to prevent engagement of the side wall means with the floral grouping.

16. The method of claim 15 wherein the step of providing the floral grouping is defined further as providing the floral grouping with a stem end and a bloom end, and wherein the step of wrapping the floral grouping with the sheet of material is defined further as wrapping the floral grouping with the sheet of material to provide the wrapper having an upper end and a lower end, the bloom end of the floral grouping being disposed near the upper end of the wrapper and at least a portion of the reinforcing member means being disposed near the upper end of the wrapper.

17. The method of claim 15 wherein the step of providing the floral grouping is defined further as providing the floral grouping having a bloom end and a stem end, and wherein the step of disposing the floral grouping in the floral grouping storage space of the carton is defined further as disposing the floral grouping in the floral grouping storage space of the carton whereby the wrapper or the reinforcing member means or a combination of the wrapper and the reinforcing member means is engageable with the side wall means and the reinforcing member means prevents engagement of the side wall means with the bloom end of the floral grouping, the reinforcing member means thereby cooperating to substantially reduce or prevent damage to the bloom end of the floral grouping when the wrapper moves in the carton.

18. The method of claim 15 wherein the step of wrapping the floral grouping is defined further as wrapping the floral grouping with the sheet of material to form the wrapper having a substantially cylindrically shape.

19. The method of claim 15 wherein the step of wrapping the floral grouping is defined further as wrapping the floral grouping with the sheet of material to form the wrapper having a substantially conical shape.

20. The method of claim 15 wherein the step of providing the sheet of material is defined further as providing the sheet of material constructed from a material selected from the group of materials consisting of paper, metal foil, fiber (natural or synthetic), denim, burlap or film or combinations thereof.

* * * * *

UNITED STATES PATENT AND TRADEMARK OFFICE
CERTIFICATE OF CORRECTION

PATENT NO. : 5,467,575
DATED : November 21, 1995
INVENTOR(S) : Weder, et al.

Page 1 of 3

It is certified that error appears in the above-indentified patent and that said Letters Patent is hereby corrected as shown below:

In the drawings, please add reference numeral -- 44 -- to Figure 3 as indicated below.

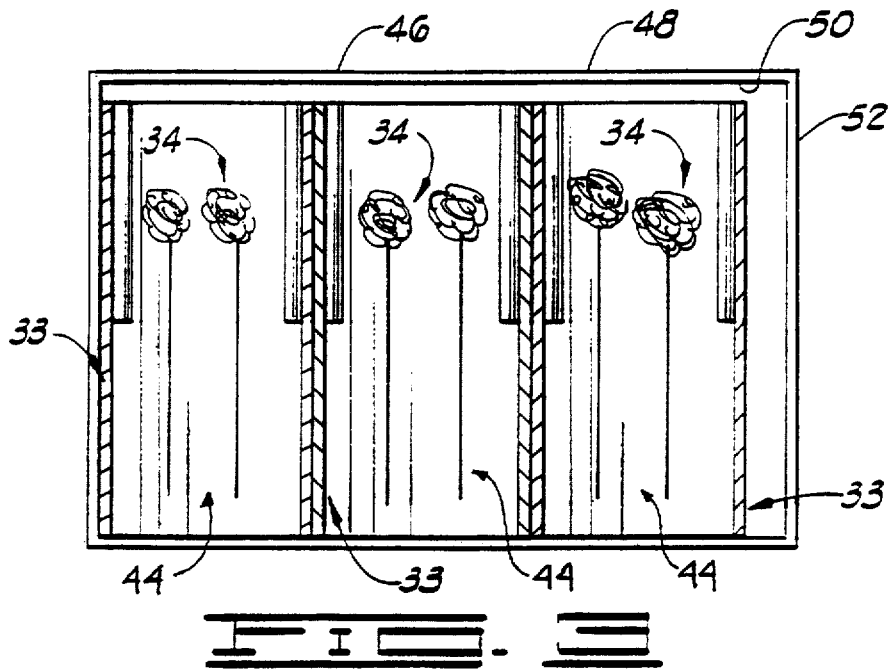

UNITED STATES PATENT AND TRADEMARK OFFICE
CERTIFICATE OF CORRECTION

PATENT NO. : 5,467,575
DATED : November 21, 1995
INVENTOR(S) : Weder, et al.

Page 2 of 3

It is certified that error appears in the above-indentified patent and that said Letters Patent is hereby corrected as shown below:

In the drawings, in Figure 4, reference numeral "33a" should be -- 38a --.

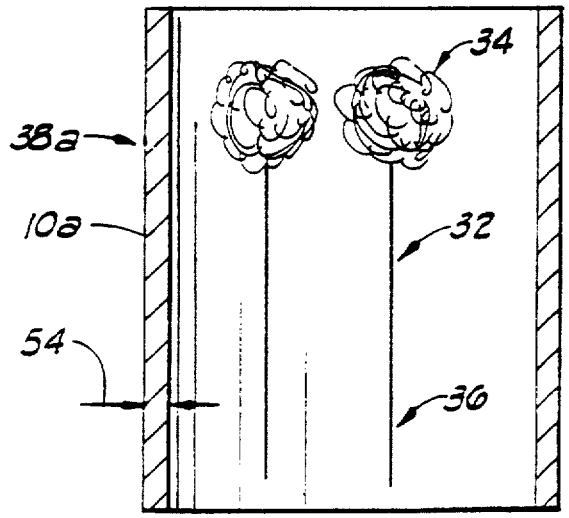

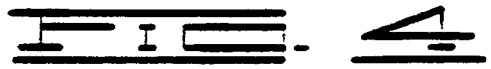

UNITED STATES PATENT AND TRADEMARK OFFICE
CERTIFICATE OF CORRECTION

PATENT NO. : 5,467,575
DATED : November 21, 1995
INVENTOR(S) : Weder, et al.

It is certified that error appears in the above-indentified patent and that said Letters Patent is hereby corrected as shown below:

On the title page item [56].

REFERENCES CITED, FOREIGN PATENT DOCUMENTS, "880254" should be -- 8802054 --.

Column 2, line 31, after "adhesive" delete "preferably a pressure sensitive adhesive,".

Column 3, line 22, after "first and the" insert -- second --.

Column 3, line 37, after "materials" insert -- or --.

Column 3, line 44, after "first and the" insert -- second --.

Column 4, line 13, "40" should be -- 42 --.

Column 5, line 3, after "placed" insert -- in --.

Signed and Sealed this

Twenty-fifth Day of June, 1996

Attest:

BRUCE LEHMAN

*Attesting Officer*       *Commissioner of Patents and Trademarks*